United States Patent [19]

Gillott

[11] 4,404,484
[45] Sep. 13, 1983

[54] ELECTRIC ROTATING MACHINE
[75] Inventor: George L. Gillott, Prospect, Conn.
[73] Assignee: Tri-tech, Inc., Waterbury, Conn.
[21] Appl. No.: 241,362
[22] Filed: Mar. 6, 1981
[51] Int. Cl.³ ............................................. H02K 37/00
[52] U.S. Cl. .................................... 310/49 R; 310/41; 310/156; 310/163
[58] Field of Search .......... 310/41, 156, 154, 162–164, 310/257, 49

[56] References Cited

U.S. PATENT DOCUMENTS

| 3,370,189 | 9/1964 | Haydon | 310/154 X |
| 3,495,107 | 4/1969 | Haydon | 310/257 |
| 3,857,053 | 12/1974 | Yatsushiro | 310/41 |
| 3,999,090 | 12/1976 | Sinnott | 310/154 X |
| 4,004,168 | 1/1977 | Haydon | 310/41 |
| 4,021,689 | 5/1977 | Baltrush | 310/41 |
| 4,061,936 | 12/1977 | Woolley | 310/41 |

*Primary Examiner*—Donovan F. Duggan
*Attorney, Agent, or Firm*—Lee C. Robinson, Jr.

[57] ABSTRACT

A self-starting unidirectional rotating machine, suitable for use as a stepping motor, has a permanent magnet rotor and a pair of finger-like pole pieces extending axially alongside the rotor. These pole pieces are disposed asymmetrically so that, for example, the center of one pole piece is substantially diametrically aligned with an edge of the other pole piece. Bias magnets create a bias flux flowing through the pole pieces. A helical coil, when energized, provides a main rotor flux opposite to the bias flux and sufficient to overcome it. Upon energization, the rotor turns 180 electrical degrees in a preferred direction from a quiescent position to a second position. Then, upon deenergization, the rotor turns 180 electrical degrees from its second position to its quiescent position.

12 Claims, 4 Drawing Figures

ELECTRIC ROTATING MACHINE

BACKGROUND OF THE INVENTION

1. Field of the Invention

This invention relates to electric rotating machines, and more particularly relates to self-starting unidirectional synchronous and stepper motors.

2. Brief Description of the Prior Art

There has been developed a class of electric motors which are compact and extremely efficient. Representative motors of this type are disclosed for example in U.S. Pat. No. 3,370,189, to Arthur W. Haydon, U.S. Pat. No. 3,495,107, to Arthur W. Haydon, U.S. Pat. No. 3,564,314, to Arthur W. Haydon, U.S. Pat. No. 3,671,841 to Gotfred O. Hoffman, U.S. Pat. No. 3,495,113, to Arthur W. Haydon, U.S. Pat. No. 3,626,263, to Maurice G. McBride, and U.S. Pat. No. 4,004,168, to Arthur W. Haydon. To achieve unidirectional self-starting characteristics, motors of this type include auxiliary devices, such as shading coils or auxiliary pole pieces, so that upon energization of the stator field coil, the rotor will uniformly and consistently begin its rotation in a predetermined direction.

Electric motors of the foregoing type are frequently used in situations where the device must operate reliably for extended periods of time in a sealed or inaccessible location. For example, motors of this type are often used in airborne or space vehicles. Under such conditions, the motors should be as simply constructed as possible, with a minimum number of parts, because the potential for failure is directly related to the number of such parts. In addition, in aerospace applications, the weight of the motor whould advantageously be as small as possible.

To further improve the overall compactness and efficiency of the motors, and, at the same time, to reduce their cost to the ultimate consumer, it is desirable to simplify the design of the stator as much as possible. For example, the design of the field coil itself should be made as simple as possible, for example, as a helical winding surrounding the rotor. In addition, it would be advantageous to eliminate such parts as shading rings or auxiliary pole pieces. However, attempts to eliminate such parts, or to provide non-exotic stator windings, have in the past often resulted in motors that either are not self-starting, or do not consistently turn in the proper direction.

Difficulties have also been encountered in the assembly of previously-proposed motors, particularly in the successive steps necessary to assemble all of the pole-pieces and auxiliary parts of the stator. These numerous steps have resulted in a high labor cost in constructing the motors.

OBJECTS AND SUMMARY OF THE INVENTION

One general object of this invention, therefore, is to provide a new and improved self-starting unidirectional electric rotating machine suitable for use as a stepper motor.

It is more specific object of this invention to provide an electric rotating machine which avoids the aforementioned defects of previously-proposed devices.

It is another object of this invention to provide an electric rotating machine in which the number of parts thereof, and the concommitant number of assembly steps required to produce it, it kept to a minimum.

It is still another object of this invention to provide an electric rotating machine which uniformly and consistently starts in a given direction.

It is yet another object of this invention to provide an electric rotating machine which is unidirectional and self starting, and which avoids the need for auxiliary pole pieces, shading rings, or other similar features.

A still further object of this invention is to provide an electric rotating machine utilizing comparatively simple mechanical and electrical components, and which is economical to manufacture and thoroughly reliable in operation.

According to one illustrative embodiment of this invention, the stepper motor or other electric rotating machine includes a rotor assembly formed of a rotor shaft and a permanent magnet rotor magnetized to have at least one pair of magnetic poles of mutual opposite polarity arranged circumferentially about the shaft and separated from each other by an electrical angle of $n\pi$ where n is an odd integer. Surrounding the rotor assembly is a stator assembly including a helical stator coil generally surrounding and coaxial with the rotor and through which an actuating electric current is to flow, a case formed of ferromagnetic material surrounding the coil and providing a flux path for magnetic stator flux outside the coil, first and second pole pieces extending from respective ends of the case into the interior thereof between the coil and the rotor and disposed circumferentially at an electrical angle different form $n\pi$, to form a flux path for magnetic stator flux inside the stator coil, and first and second biassing magnets arranged at the respective ends of the case so that the first and second pole pieces are given north and south quiescent polarizations. In one embodiment, the rotor has a single pair of poles so that an electrical angle of $\pi$ equals 180 degrees of mechanical angle. In that embodiment, the pole pieces are arranged as first and second fingers extending from the bias magnets into the case, and are disposed relative to the axis of the motor so that the first finger is centered substantially on a diameter of the rotor extending to an edge of the second finger.

According to other possible embodiments of this invention, a stepper motor includes a stator structure of magnetic material; a field coil within a portion of the stator structure and generating a magnetic flux therein when the field coil is energized with externally derived pulses of electrical potential; a rotor of permanent magnet material having at least a pair of poles thereon of opposite magnetic polarity, the rotor being situated in the path of a principal portion of the stator flux; a permanent magnet biassing flux generator for generating bias flux passing through the rotor, the direction of flow thereof being opposite to that of the stator flux flowing through the rotor when the field coil is energized. Such a stepper motor includes a pair of oppositely directed pole-piece fingers disposed parallel to the axis of the rotor and circumferentially asymmetrically arranged so that the electrical angle separating fingers is greater in one rotational direction that in the other. In such a stepper motor, it is possible to provide an extremely simple arrangement of field coil, namely, a helical winding coaxial with the rotor and surrounding the fingers.

In accordance with an arrangement of several preferred embodiments of this invention, an electric rotating device responsive to an electrical current to rotate half of a revolution, and to the cessation of the electrical current to rotate the remaining half of a revolution, is easily constructed. Such an electric rotating device can comprise a case formed of first and second ferromagnetic cup-like members each having an open end, a cylindrical wall, and a partly-closed end, with the cup-like numbers being joined together at the open ends; a helical armature winding within the joined-together cup-like members to generate stator flux in response to the electrical current; first and second flat discoid axially polarized bias magnets disposed at the partly-closed ends of the first and second-cup members, respectively, and having respectively opposite poles coupled to such ends; a first pole piece having a portion contacting the pole of the first bias magnet, opposite to the one coupled to the respective partly-closed end, and a finger portion extending therefrom parallel to and within the armature winding, such finger having a center; a second pole piece having a portion contacting the pole of the second bias magnet, opposite to the one coupled to the respective partly closed end, and a finger portion extending therefrom parallel to and within the armature winding, such finger portion having an edge disposed substantially opposite to the center of the finger of the first pole piece; and a rotor including a rotor shaft mounted coaxially within the armature winding and a cylindrical permanent rotor magnet disposed between the fingers and having a pair of poles directed radially from one another.

The present invention, as well as further objects, features, and advantages thereof, will be understood more clearly and fully from the ensuing description of one preferred embodiment, when read in conjunction with the accompanying drawings.

DETAILED DESCRIPTION OF A PREFERRED EMBODIMENT

Figure 1:
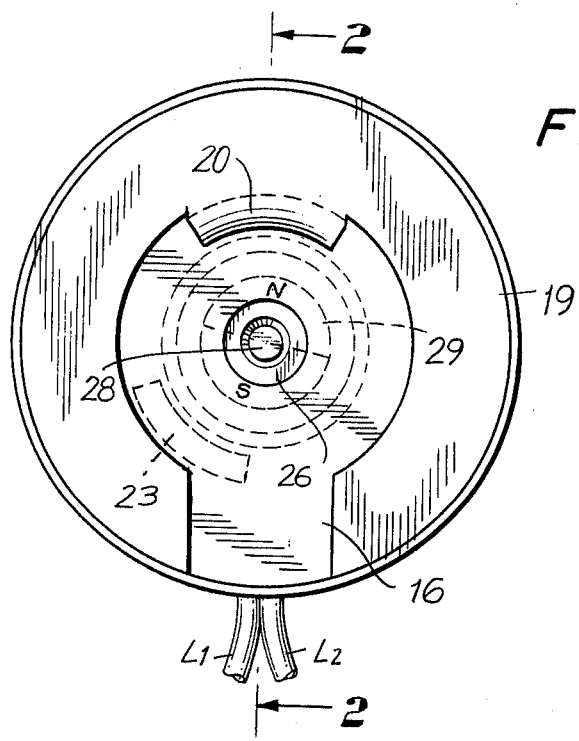
FIG. 1 is an end view of an electric motor embodying the present invention.
Figure 2:
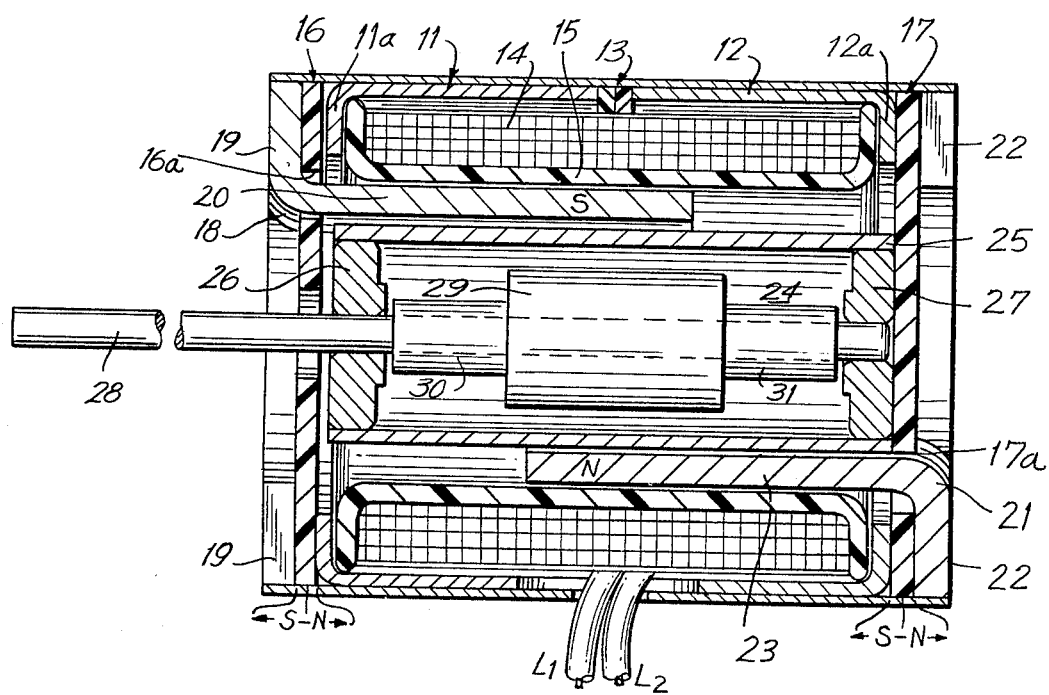
FIG. 2 is a sectional view, along the line FIG. 2—2 in FIG. 1, of the electric motor.

Referring to FIGS. 1 and 2 of the drawings, an electric motor according to this invention is shown to include a case 10 formed of first and second cups 11 and 12, each having a partly-closed end 11a and 12a, respectively. The cups 11 and 12 are joined together at the open ends thereof by an insulator ring 13. This case 10 forms a part of the flux path for the electric motor, and is favorably constructed of a ferromagnetic material of good structural strength, such as chromium steel. Insulator rings 13 can be formed of any convenient insulator material, such as fish paper. A sheath 10' can surround the case 10.

Within case 10 is a stator electromagnet formed of a coil 14 helically wound on a bobbin 15. In this embodiment, the coil 14 consists of 600 turns of #32 gauge magnet wire and is adapted to have an energizing electric current applied thereto through leads $L_1$ and $L_2$ at 5 volts DC. Bobbin 15 is preferably formed of nylon.

Flat discoid permanent magnets 16 and 17, are disposed at the partly-closed ends 11a and 12a of cups 11 and 12, respectively. These permanent magnets 16 and 17 are magnetized in the thickness direction thereof, that is, in the axial direction of the motor, so that the north pole of magnet 16 contacts partly-closed end 11a, while the south pole of magnet 17 contacts partly closed end 12a. These bias magnets 16 and 17 preferably have an energy factor of between 1.4 and 2, and can be conveniently formed of Plastiform, available from the Lehman division of the 3M Co. The motor further comprises a first pole piece 18 having a ring portion 19 in contact with the south-pole side of bias magnet 16 and a finger portion 20 extending into the interior of the stator adjacent to bobbin 15 and coaxial therewith. Similarly, a second pole piece 21 is provided with a ring portion 22 in contact with the north-pole side of bias magnet 17 and a finger portion 23 extending into the interior of the stator, and adjacent and coaxial with bobbin 15. Apertures 16a and 17a are provided in bias magnets 16 and 17 to admit passage therethrough of the respective finger portions 20 and 23.

As shown in FIG. 2 pole-piece finger portions 20 and 23 are asymetrically arranged about the motor axis in the circumferential direction. In other words, if the center of finger portion 20 is taken as a reference, the center of finger portion 23 is closer in the counter-clockwise direction than it is in the clockwise direction. Preferably, as shown in FIG. 2, first finger portion 20 is centered on a diameter of the motor extending substantially to one edge of second finger portion 23. In this embodiment, the center of second finger portion 23 is displaced circumferentially by approximately 39 degrees (mechanical) from a point diametrically opposed to the center of first finger portion 20.

A rotor assembly is disposed between finger portions 20 and 23 and is coaxial with the stator assembly. The rotor assembly is formed of a rotor sheath 25 formed of a non-magnetic material such as copper or brass. First and second bearings 26 and 27 support a rotor shaft 28 rotatably journaled therewithin. A rotor magnet 29 is disposed on shaft 28 and is separated by nylon or teflon spacers 30 and 31 from bearings 26 and 27, respectively.

Rotor magnet 29 is formed of a convenient permanent magnet material, such as Plastiform, as identified above. As shown in FIG. 1, rotor magnet 29 is magnetized in this embodiment to have a north pole N and a south pole S disposed 180 degrees from one another. Thus, in this embodiment, an electrical angle of $\pi$ equals a mechanical angle of 180 degrees.

Rotor magnet 29 is shown in FIG. 1 in its quiescent state. The position taken by rotor magnet 29 is determined as an equilibrium position between pole-piece finger portions 20 and 23. Finger portion 20 is induced by bias magnet 16 to have a south polarity and finger portion 23 is induced by bias magnet 17 to have a north polarity. Thus, north pole N of rotor magnet 29 quiescently rests at a position slightly clockwise of the center of finger portion 20 while south pole S quiescently rests at a position slightly counter-clockwise of the center of pole piece finger portion 23.

The unidirectional and self-starting characteristics of the motor described in this embodiment can be explained with reference to FIGS. 3A and 3B.

Figure 3A:
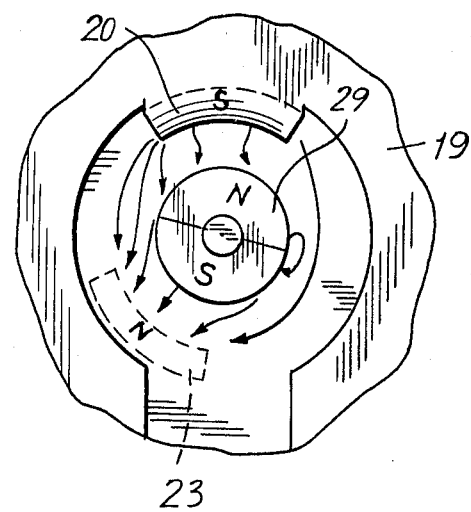
FIGS. 3A and 3B are diagrams useful in explaining the self-starting and unidirectional characteristics of the motor of this invention.
Figure 3B:
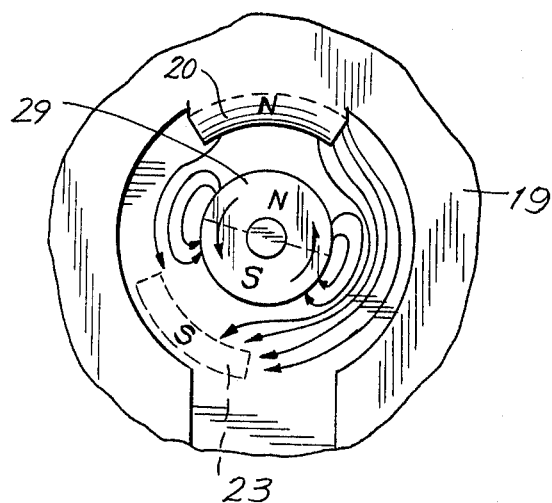

As shown in FIG. 3A, if there is no electrical current applied to stator coil 14, the biasing field supplied by bias magnets 16 and 17 establishes the quiescent position of rotor magnet 29 as shown in FIG. 3A. Bias magnets 16 and 17 cause finger portions 20 and 23 to be magnetized as south and north magnetic poles, respectively, thereby causing lines of flux to flow from finger portion 20 into north pole N of rotor magnet 29, and from south pole S thereof into the north-magnetized finger portion 23. A small amount of flux also flows around rotor magnet 29 directly between finger portions 20 and 23, as indicated by the arrows on FIG. 3A.

If an actuating electric current is applied to stator coil 14 in the intended direction, the magnetic field generated by stator coil 14 will cause pole pieces 18 and 21 to be magnetized in the direction opposite to the magnetism imparted by bias magnets 16 and 17. In other words, when the current is first applied, the direction of the magnetic field in the interior of the stator changes. However, because of hysteresis delay in the ferromagnetic material forming finger portions 20 and 23, the magnetic field is momentarily distorted. A small residual magnetism in the finger portions 20 and 23 causes the magnetic flux density to be slightly weaker to the lift of rotor magnet 29, as viewed in FIG. 3B, but to be considerably stronger on the right of rotor magnet 29. Because the magnetic flux lines are bunched up on the right side of rotor magnet 29, the latter is subjected to a torque to urge it to rotate counter-clockwise.

After a small amount of time, the field between finger portions 20 and 23 becomes completely reversed, and the flux takes on a density pattern similar, but opposite in direction, to that shown in FIG. 3A.

Thus, when current is applied to stator coil 14, rotor magnet 29 undergoes a counter-clockwise rotation of 180 degrees, until north pole N and south pole S of rotor magnet 29 have exchanged positions, at which point the rotor stops.

Then, if current is removed from stator coil 14, bias magnets 16 and 17 once again impose the original magnetic field onto pole-piece finger portions 20 and 23, respectively. However, because of the delay in the buildup of the bias magnetic field in the ferromagnetic material of pole pieces 18 and 21, the magnetic flux lines tend to bunch up on the right of rotor magnet 29, in a fashion similar, but opposite, to that shown in FIG. 3B, thereby imposing a counter-clockwise torque on rotor magnet 29 so that the latter is again urged to rotate counter-clockwise 180 degrees. Thus, rotor magnet 29 attains its original position as shown in FIG. 3A.

As a consequence of the structure thereof, this motor is consistently and reliably caused to rotate in one predetermined direction.

Of course, if current is applied in the opposite sense, thereby reinforcing the magneic fields imposed by bias magnets 16 and 17, rotor magnet 19 will remain in its quiescent position as shown in FIG. 3A.

Because of its property of reliably turning 180 degrees when current is applied, and turning the remaining 180 degrees when the current is removed, the above-described electric motor can favorably be used as a stepping motor.

Alternatively, if an alternating current is applied to stator coil 14, the above-described electric motor can be used as a self-starting unidirectional synchronous motor.

While a single embodiment has been described in detail hereabove, it will be apparent that many variations are possible according to this invention. For example, an electric rotating machine could be constructed according to this invention in which the rotor magnet 29 is provided with a plurality of pairs of poles, rather than only a single pair of poles. In such a machine, the spacing between consecutive poles will correspond to an electrical angle of $\pi$, and the stator assembly should then be arranged with pole-piece fingers 20 and 23 disposed circumferentially at an electrical angle slightly different from $n\pi$, where n is an odd integer. In one example a rotor magnet 29 can have six poles, rather than a single pair of poles. In that case, an electrical angle of $\pi$ will correspond to a mechanical angle of 60 degrees. Thus, application of current will cause a machine to step through a rotation of 60 degrees, and removal of current will cause a further step of 60 degrees.

Still further variations and modifications of the above-described embodiment will be apparent to persons skilled in the art, without departing from the scope and spirit of this invention, which is to be ascertained from the appended claims.

What is claimed is:

1. An electric rotating machine comprising a rotor assembly including a rotor shaft and a permanent magnet rotor magnetized to have at least one pair of magnetic poles of mutually opposite polarity arranged circumferentially about said shaft and being separated by an electrical angle of $n\pi$ where n is an odd integer; and a stator assembly generally surrounding said rotor and including a helical stator coil generally surrounding and coaxial with said rotor and through which electric current is to flow, a case surrounding said coil and having first and second ends corresponding to opposite ends of the shaft, first and second pole pieces of substantially the same size extending from respective ends of the case into the interior thereof between said coil and said rotor and disposed circumferentially at an electrical angle different from $n\pi$; and first and second biasing magnets arranged at the respective ends of said case so that the first and second pole pieces are given respective north and south quiescent polarizations.

2. An electric rotating machine according to claim 1, wherein said case is formed generally as a hollow cylinder of ferromagnetic material, said first and second biasing magnets are flat disc magnets disposed at opposite ends of the cylinder, and said pole pieces each have a portion in contact with a respective biasing magnet and a finger extending axially inside the case.

3. An electric rotating machine according to claim 2, wherein said biasing magnets are axially polarized.

4. An electric rotating machine comprising a rotor assembly formed of a shaft and a cylindrical permanent magnet rotor coaxial with and affixed to the shaft and magnetized to have at least one pair of magnetic poles of mutually opposite polarity arranged circumferentially about said shaft and separated from one another by an electrical angle of $n\pi$ where n is an odd interger; and a stator assembly generally surrounding said rotor and including a stator winding, and a magnetic flux circuit including first and second pole pieces of substantially the same size extending parallel to the axis of said rotor and separated from one another by an electrical angle different from $n\pi$, biasing magnet means for imparting to said first and second pole pieces respective quiescent north and south polarities, and return flux path means for magnetic flux passing outside said rotor.

5. A rotating machine according to claim 4, wherein said pole pieces each include a finger extending axially along a portion of the rotor and circumferentially from a center to two edges thereof, and said fingers are circumferentially arranged so that one edge of one of the fingers is at an electrical angle of substantially $n\pi$ from the center of the other of the fingers.

6. A rotating machine according to claim 5 wherein the finger of the first pole piece is centered substantially on a diameter of the rotor extending to an edge of the finger of the second pole piece.

7. An electric rotating machine comprising a rotor assembly formed of a shaft and a cylindrical permanent magnet rotor coaxial with and affixed to said shaft and having a magnetization consisting essentially of a north pole and a south pole diametrically opposed to one another; and a stator assembly generally surrounding said rotor and including a stator winding and a magnetic flux circuit including first and second pole pieces of substantially the same size each including a finger extending axially along a portion of the rotor, and circumferentially from one edge to another edge thereof; with the finger of the first pole piece being substantially centered on a diameter of the rotor extending to said one edge of the finger of the first pole piece.

8. In a stepper motor of the type comprising a stator structure of magnetic material; a field coil within a portion of said stator structure and generating a magnetic flux therein when the field coil is energized with externally-derived pulses of electrical potential; a rotor of permanent magnet material having at least a pair of poles thereon of opposite magnetic polarity, said rotor being situated in the path of a principal portion of said stator flux; permanent-magnet biasing flux generator means for generating a bias flux passing through said rotor, the direction of flow thereof being opposite to that of the stator flux flowing through said rotor when said field coil is energized; and means on said structure magnetically conducting at least a portion of said bias and stator fluxes for ensuring self-starting and unidirectional rotation of the rotor; the improvement wherein the last-mentioned means includes a pair of oppositely directed pole-piece fingers of substantially the same size disposed parallel to the axis of the rotor and circumferentially arranged so that the electrical angle separating the fingers is greater in one rotational direction than in the other.

9. A stepper motor according to claim 8, wherein said fingers are disposed about said rotor so that when one pole of the pair of poles thereof is aligned with the center of one of the pair of fingers, the other of the pair of poles is aligned with an edge of the other of the pair of fingers.

10. A stepper motor according to claim 8, wherein said field coil is helically wound and is coaxial with the rotor and surrounds said fingers.

11. An electrical rotating device responsive to an electrical current to rotate half of a revolution and responsive to the cessation of the electrical current to rotate another half of a revolution, comprising a case formed of first and second ferromagnetic cup-like members each having an open end, a cylindrical wall, and a partly closed end, and being joined together at the open ends; a helical winding within the joined-together cup-like members to generate stator flux in response to said electrical current; first and second flat discoid axially polarized bias magnets disposed at the partly-closed ends of the first and second cup-like members, respectively, and having respectively opposite poles coupled to such ends; a first pole piece having a portion contacting the pole of the first bias magnet, opposite to the pole coupled to the respective partly closed end, and a finger portion extending therefrom parallel to and within said armature winding, such finger portion having a center; a second pole piece having a portion contacting the pole of the second bias magnet, opposite to the pole coupled to the respective partly closed end, and a finger portion extending therefrom parallel to and within said armature winding, such finger portion having an edge disposed substantially diametrically opposite the center of the finger portion of the first pole piece; and a rotor including a rotor shaft mounted coaxially within said helical winding and a cylindrical permanent rotor magnet disposed between said finger portions and having a pair of poles directed radially from one another.

12. An electric rotating device according to claim 11, further comprising a cylindrically-walled rotor housing formed of nonmagnetic material disposed between said finger portions and said rotor magnet.

* * * * *